United States Patent
Murooka et al.

(10) Patent No.: US 7,341,425 B2
(45) Date of Patent: Mar. 11, 2008

(54) AXIAL FLOW COMPRESSOR

(75) Inventors: Takashi Murooka, Chiyoda-ku (JP);
Hidekazu Kodama, Chiyoda-ku (JP);
Masahiko Yamamoto, Chiyoda-ku (JP);
Kenichi Shinohara, Chiyoda-ku (JP);
Akira Takahashi, Chiyoda-ku (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 214 days.

(21) Appl. No.: 11/090,284

(22) Filed: Mar. 28, 2005

(65) Prior Publication Data

US 2006/0216142 A1   Sep. 28, 2006

(51) Int. Cl.
*F01D 11/08*   (2006.01)
(52) U.S. Cl. .................... 415/170.1; 416/183
(58) Field of Classification Search ......... 415/170.1, 415/199.5, 211.2; 416/183, DIG. 2
See application file for complete search history.

(56) References Cited

U.S. PATENT DOCUMENTS 1,141,473 A * 6/1915 Metten ................ 415/199.5
4,606,699 A * 8/1986 Hemsworth ........... 415/173.1
4,645,417 A * 2/1987 Wisler ................. 415/173.1
4,738,586 A * 4/1988 Harter ................. 415/173.5
5,397,215 A * 3/1995 Spear et al. .............. 415/191

FOREIGN PATENT DOCUMENTS

JP    6-317184    11/1994

OTHER PUBLICATIONS

Tanida et al., Gas Turbine Engines, p. 41, issued by Asakura Book Shop.
Horlock, Axial Flow Compressors, 1958, pp. 76-81, Butterworths Scientific Publications, London.
Aerodynamic Design of Axial-Flow Compressors, pp. 299-300, NASA.

* cited by examiner

*Primary Examiner*—Igor Kershteyn
(74) *Attorney, Agent, or Firm*—Griffin & Szipl, P.C.

(57) ABSTRACT

An axial flow compressor is provided with a rotor blade row (10) which is formed such that an outlet cross sectional area is larger than an inlet cross sectional area so as to reduce a speed in an axial direction and reduce a pressure difference between a positive pressure surface and a negative pressure surface. Further, a stator blade row (11) is provided in a downstream side of the rotor blade row (10). An output cross sectional area of the stator blade row (11) is structured such as to be smaller than an inlet cross sectional area of the rotor blade row (10).

8 Claims, 6 Drawing Sheets

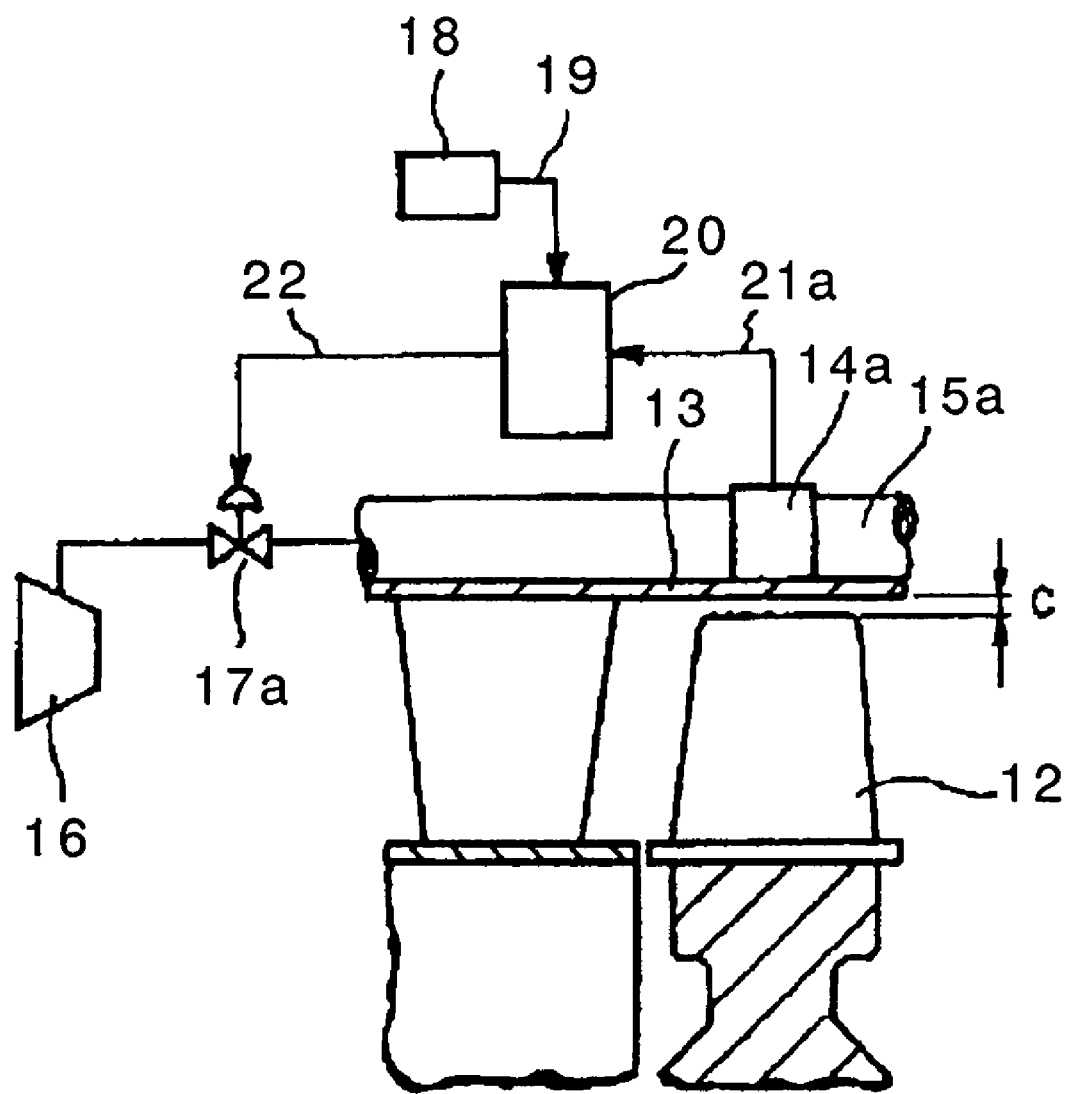

PRIOR ART

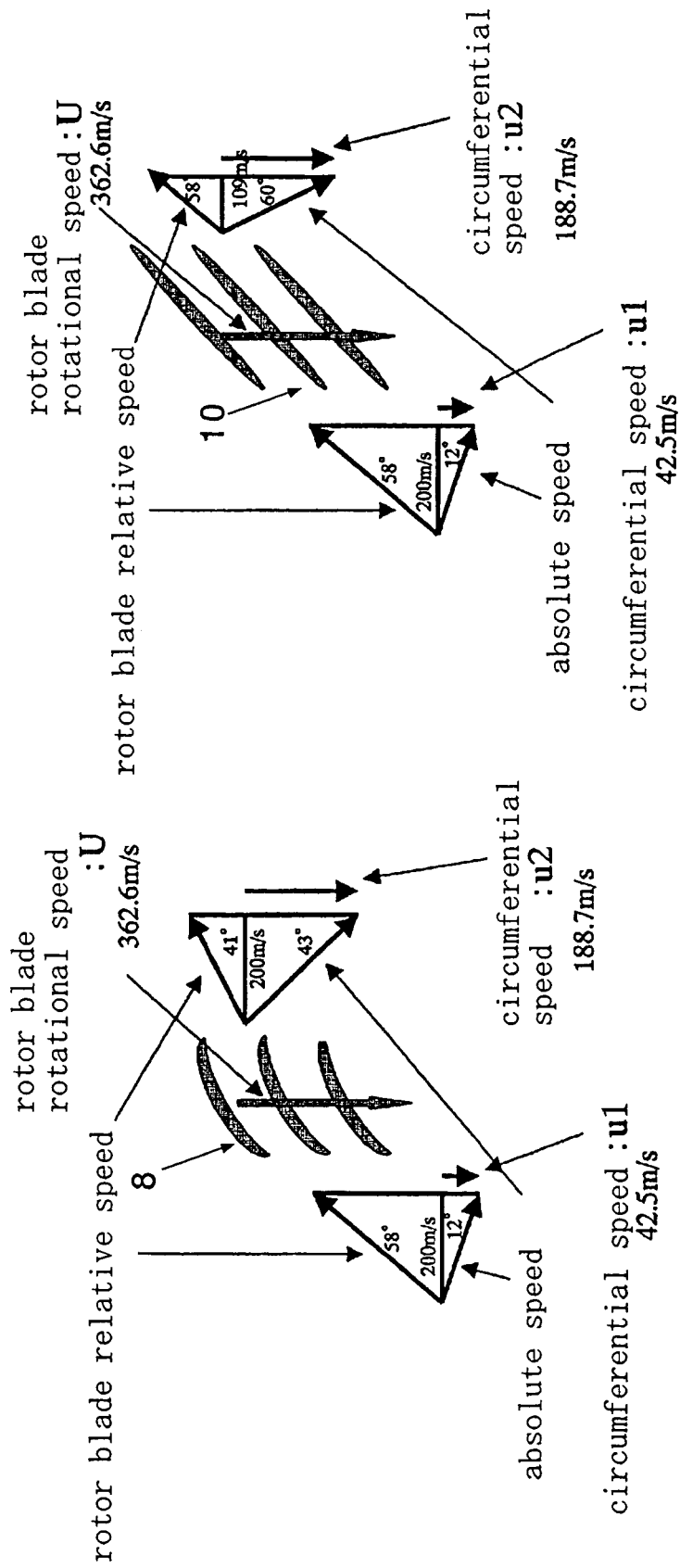

AXIAL FLOW COMPRESSOR

BACKGROUND OF THE INVENTION

1. Technical Field of the Invention

The present invention relates to an axial flow compressor which can reduce a tip clearance loss so as to inhibit a stall.

2. Description of the Related Art

FIG. 1 is a schematic view of a structure of a turbojet engine. The turbojet engine is provided with an air intake port 1, a compressor 2, a combustor 3, a gas turbine 4, an after burner 5, a jet nozzle 6 and the like. In the turbojet engine mentioned above, the structure is made such that an air is introduced from the air intake port 1, the air is compressed by the compressor 2, a fuel is burnt within the combustor 3 so as to generate a high temperature combustion gas, the gas turbine 4 is driven by the generated combustion gas, the compressor 2 is driven by the gas turbine 4, the fuel is reheated by an exhaust gas getting out of the turbine by the after burner 5, and the high temperature combustion exhaust gas is expanded by the jet nozzle 6 so as to be injected to a rear side, whereby a thrust is generated. The basic structure is approximately the same in the other jet engines than the turbojet engine.

In the jet engine mentioned above, the other gas turbine, or a compressor simple substance, a clearance between a leading end (a tip) of a rotor blade constituting the compressor and a casing inner surface is generally called as a tip clearance. The tip clearance is preferably set to be always smaller in view of improving a compression efficiency, however, since the tip clearance is affected in an actual operation by (1) an elongation of the rotor blade due to a centrifugal force, (2) a thermal expansion of the rotor blade, (3) a thermal expansion of the casing and the like, the tip clearance is variously fluctuated in correspondence to an operational state.

FIG. 2 is a view schematically showing a change of the tip clearance at a time of starting. In a stopped state of the compressor, all of the rotor blade, and the rotor, the casing and the like to which the rotor blade is attached are at a room temperature (for example, 20 to 30° C.), and the tip clearance comes to the maximum (a point A). When the compressor is started and the rotor blade starts rotating, the rotor blade is elongated due to the centrifugal force and the tip clearance becomes small (a point B). Next, the temperature of the compressed air is increased on the basis of an adiabatic compression of the air, whereby the rotor blade having a small heat capacity is first thermally expanded and the tip clearance becomes smaller to the minimum (a point C). Next, the casing and the rotor having a large heat capacity are thermally expanded, the tip clearance is gradually increased, and comes to an approximately fixed design range (a point D) in a steady state.

In order to keep the tip clearance mentioned above in an optimum state, for example, Japanese Unexamined Patent Publication No. 06-317184 has been already filed.

A "tip clearance control apparatus" described in Japanese Unexamined Patent Publication No. 06-317184 is provided, as shown in FIG. 3, with a temperature detector 14a attached to a casing 13, a cooling tube 15a in which one end is connected to a compressor portion 16, the other end is open to an ambient air and an intermediate portion is attached to the casing 13 so as to be positioned near the temperature detector 14a, a flow rate adjusting valve 17a provided in the cooling tube 15a, a heat deformation data storage device 18 storing a relation between a tip clearance C in a leading end portion of a rotor blade 12 with respect to an inner side portion of the casing 13 and a temperature of a portion to which the temperature detector 14a is attached as a heat deformation data signal 19, and a heat deformation controller 20 outputting a flow rate adjusting signal 22 to the flow rate adjusting valve 17a on the basis of a temperature detection signal 21a output from the temperature detector 14a and the heat deformation data signal 19, and is structured such as to locally cool the casing 13 by circulating an air from the compressor portion 16 to the cooling tube 15a.

In this case, a flow circulating through the blade row is disclosed, for example, in documents 1, 2 and 3.

[Document 1]

Gas Turbine Engine, page 41, written by Yoshimichi Tanida and Toshio Nagashima, and issued by ASAKURA BOOK SHOP

[Document 2]

Horlock, Axial Flow Compressor, Butterworths Publications Limited

[Document 3]

AERODYNAMIC DESIGN OF AXIAL-FLOW COMPRESSORS, NASA SP-36

As shown in FIG. 2, the tip clearance is variously changed from the start time to the steady state. Accordingly, the "tip clearance control apparatus" is effective only in the case that the tip clearance is large.

Accordingly, the minimum tip clearance is set such that the leading end (the tip) of the rotor blade is not in contact with an inner surface of the casing at the point C. Therefore, in the conventional compressor, it is practically impossible to always keep the tip clearance minimum.

As mentioned above, the tip clearance is fluctuated on the basis of the operational state (a rotating speed, a compression ratio, an outside air temperature, or the like) of the compressor. In some operational state, not only the tip clearance becomes too large, and the compression efficiency is lowered, but also a flow (called as a tip clearance flow) is generated from a positive pressure surface to a negative pressure surface in the tip clearance portion between a tip end of the rotor blade and an outside passage. The tip clearance flow corresponds to a factor causing a stall which inhibits a stable operation at a time when the blade is made so as to use in high load, and a main factor of a surging phenomenon corresponding to a working limit of the compressor.

SUMMARY OF THE INVENTION

The present invention is made for the purpose of solving the problem mentioned above. In other words, an object of the present invention is to provide an axial flow compressor which can reduce a tip clearance flow circulating from a positive pressure surface to a negative pressure surface of a rotor blade even in the case that the blade is made so as to use in high load, whereby it is possible to inhibit a stall generation and a surging phenomenon.

In accordance with the present invention, there is provided an axial flow compressor comprising a rotor blade row which is formed such that an outlet cross sectional area is larger than an inlet cross sectional area so as to reduce a speed in an axial direction and reduce a pressure difference between a positive pressure surface and a negative pressure surface.

In accordance with the structure of the present invention mentioned above, since the outlet cross sectional area is formed larger than the inlet cross sectional area of the rotor blade row, and a suitable path length is provided with respect thereto, the speed in the axial direction of the flow is reduced within the rotor blade row.

Accordingly, taking a speed triangle of the rotor blade into consideration, it is known that the work of the rotor blade can be obtained even by reducing the speed in the axial direction without largely curving the flow by the blade. In the case that the same pressure ratio is obtained, an amount at which the flow is curved can be reduced by widening the passage. Accordingly, the pressure difference between the positive pressure surface and the negative pressure surface of the blade becomes small, it is possible to reduce the tip clearance flow, and it is possible to obtain the rotor blade having a wide stable working range at a high pressure ratio by reducing the tip clearance flow.

In accordance with a preferable embodiment of the present invention, a stator blade row is provided in a downstream side of the rotor blade row, and an output cross sectional area of the stator blade row is structured such as to be smaller than an inlet cross sectional area of the rotor blade row.

In accordance with the structure, a flow in the stator blade row forms a flow having a small speed reduction, has a small risk of peeling, smoothly reduces a speed and can adjust a pressure.

Further, a turning angle of the flow in the rotor blade in the rotor blade row is set to be equal to or less than 15 degree such that a difference between a direction of a rotor blade relative speed in an inflow portion and a direction of a rotor blade relative speed in an outflow portion becomes small.

In accordance with the structure, since a camber of the rotor blade row is small, the pressure difference between the positive pressure surface and the negative pressure surface of the blade becomes smaller, it is possible to reduce the tip clearance flow, and it is possible to obtain the rotor blade having a wide stable working range at a higher pressure ratio than that of the conventional blade.

The other objects and advantageous features of the present invention will be apparent on the basis of the following description with reference to the accompanying drawings.

BRIEF DESCRIPTION OF THE DRAWINGS

FIG. 3 is a schematic view of a conventional tip clearance control apparatus;

FIGS. 6A and 6B are views showing concrete examples of a speed triangle in accordance with the present invention and the prior art.

DESCRIPTION OF THE PREFERRED EMBODIMENT

Figure 1:
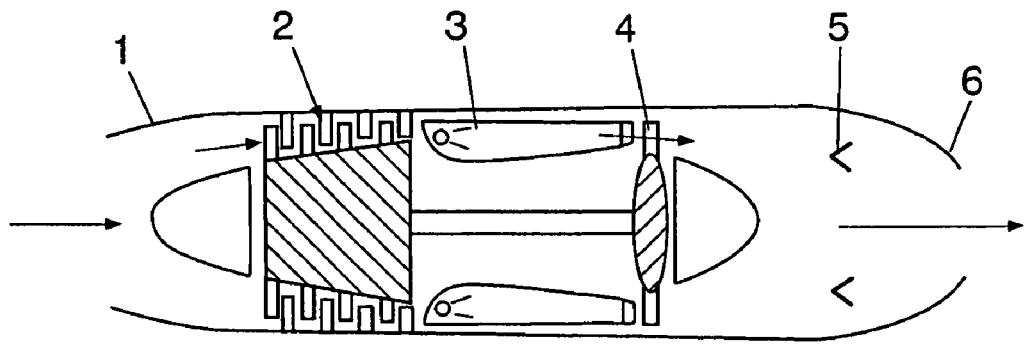
FIG. 1 is a schematic view of a structure of a turbojet engine.
Figure 2:
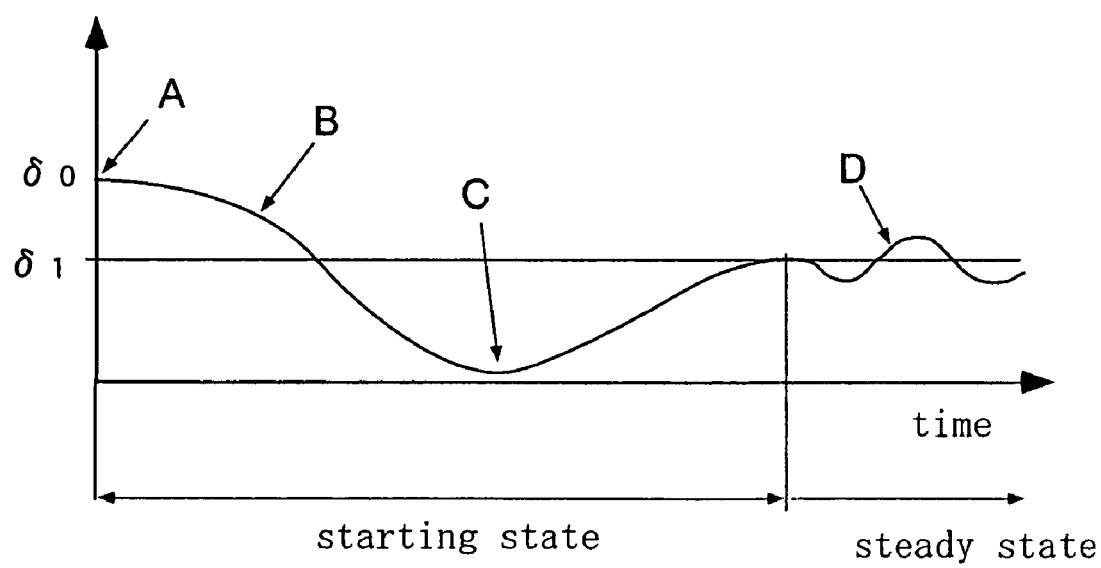
FIG. 2 is a schematic view showing a conventional fluctuation of a tip clearance.

A description will be given below of a preferable embodiment in accordance with the present invention with reference to the accompanying drawings. In this case, in each of the drawings, the same reference numerals are attached to and used in the common portions.

Figure 5A:
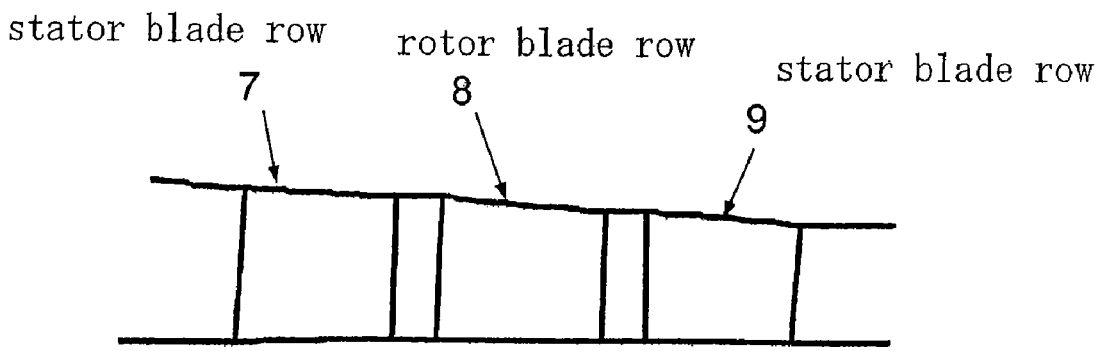
FIGS. 5A, 5B and 5C are schematic views of a conventional axial flow compressor.
Figure 5B:
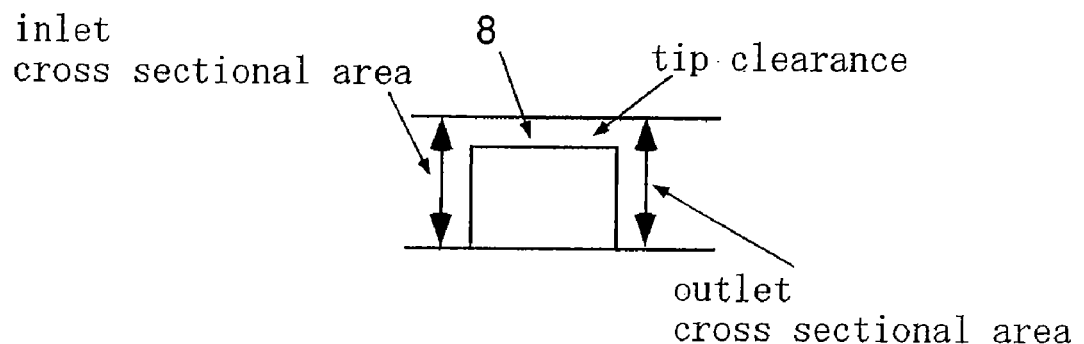
Figure 5C:
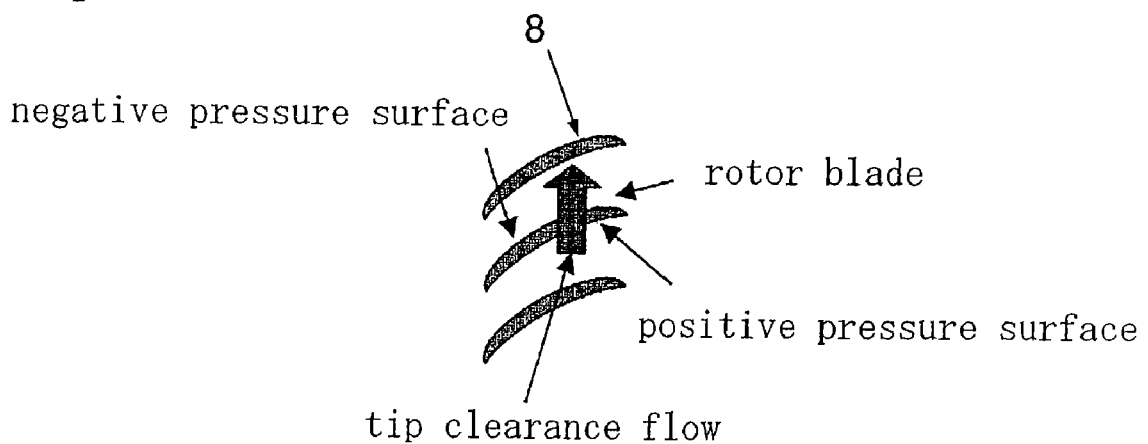

FIGS. 5A, 5B and 5C are schematic views of a conventional axial flow compressor. In these drawings, FIG. 5A shows a meridional shape, FIG. 5B is a side elevational view of a rotor blade row, and FIG. 5C is a plan view of the rotor blade row.

As shown in FIG. 5A, in a conventional axial flow compressor, a flow path cross sectional area becomes sequentially smaller in general in an order of a stator blade row 7, a rotor blade row 8 and a stator blade row 9 from an upstream side. Further, as shown in FIG. 5C, each of rotor blades constituting the rotor blade row 8 has a large camber and is structured such as to increase a positive pressure by curving the blade.

In the case of the conventional rotor blade row 8 as mentioned above, since a pressure difference between a positive pressure surface and a negative pressure surface of the rotor blade is enlarged, a tip clearance flow becomes larger, thereby causing a generation of a stall and a surging phenomenon.

Figure 4A:
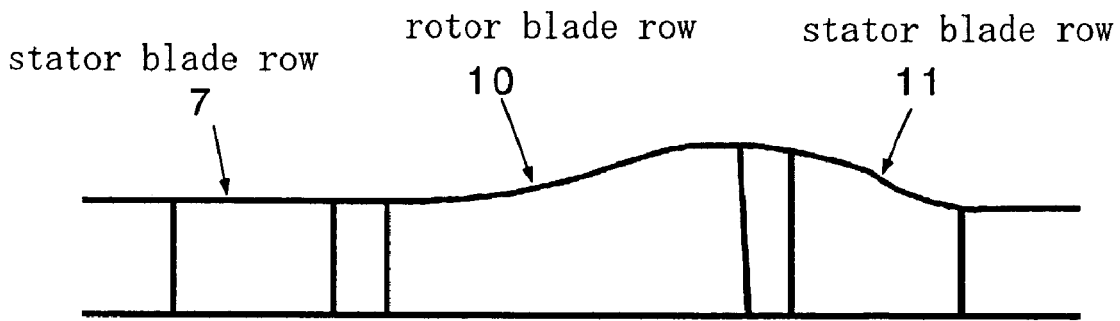
FIGS. 4A, 4B and 4C are schematic views of an axial flow compressor in accordance with the present invention.
Figure 4B:
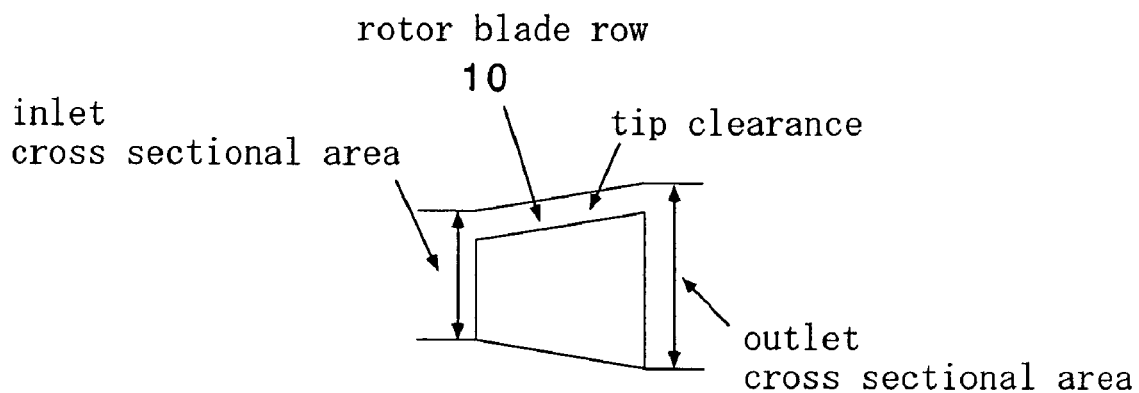
Figure 4C:
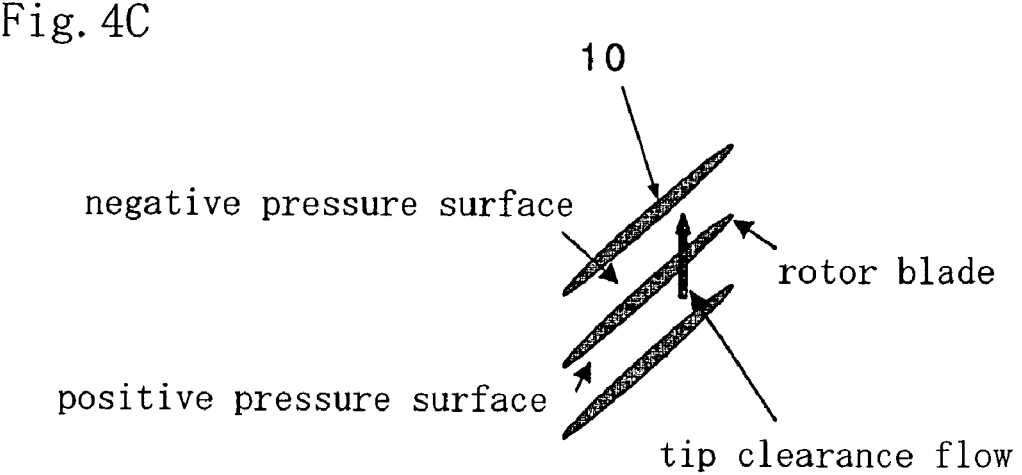

FIGS. 4A, 4B and 4C are schematic views of an axial flow compressor in accordance with the present invention. In the drawings, FIG. 4A shows a cambered meridional shape, FIG. 4B is a side elevational view of a rotor blade row, and FIG. 4C is a plan view of the rotor blade row.

As shown in FIG. 4A, the axial flow compressor in accordance with the present invention is provided with a rotor blade row 10 and a stator blade row 11 which have a different meridional shape from the conventional one.

The rotor blade row 10 in accordance with the present invention is structured, as shown in FIG. 4B, such that an outlet cross sectional area is formed larger than an inlet cross sectional area, a speed in an axial direction of the flow is reduced with a suitable passage length, and the pressure difference between the positive pressure surface and the negative pressure surface is reduced.

Further, the stator blade row 11 positioned in a downstream side of the rotor blade row 10 is structured such that an outlet cross sectional area is smaller than the inlet cross sectional area of the rotor blade row 10.

Further, in the embodiment in accordance with the present invention, the camber is set to 0 in such a manner that a direction of a rotor blade relative in the inflow portion approximately coincides with a direction of a rotor blade relative speed in the outflow portion.

In this case, the present invention is not limited to the structure, the rotor blade row 10 is preferably set such that a turning angle of the flow in the rotor blade is equal to or less than 15 degree in such a manner that a difference between the direction of the rotor blade relative speed in the inflow portion and the direction of the rotor blade relative speed in the outflow portion becomes smaller. In this case, the "turning angle of the flow" means an angle formed by relative flow vectors in the rotor blade inlet and the rotor blade outlet.

FIG. 6A shows a concrete example of a speed triangle in accordance with the present invention, and FIG. 6B shows a conventional concrete example.

In the examples, in both of the present invention (FIG. 6A) and the conventional example (FIG. 6B), a rotor blade rotational speed U is 362.6 m/s, a circumferential speed $u_1$ in an inlet side is 42.5 m/s, a circumferential speed $u_2$ in an outlet side is 188.7 m/s, and a rotor blade work is obtained by the expression U $(u_2-u_1)$=362.6×(188.7−42.5)=53012 J. Accordingly, it is the that a fluid in a downstream side keeps the same energy.

In the conventional example in FIG. 6B, a component in an axial direction is 200 m/s which is equal between an upstream side and a downstream side, by adjusting a flow path area at the rear of the rotor blade row 8 small. Accordingly, in this example, an outlet absolute speed is about 273 m/s, and a kinetic energy is converted into a pressure increase by the stationary blade row in the downstream side.

Further, in the conventional axial flow compressor, in order to achieve the speed triangle shown in FIG. 6B, each of the rotor blades constituting the rotor blade row 8 has a large camber. On the basis of the camber, a direction (58 degree with respect to an axis) of the rotor blade relative speed in the inflow portion is largely different from a direction (41 degree with respect to the axis) of the rotor blade relative speed in the outflow portion.

As a result, since the pressure difference is largely different between the positive pressure surface and the negative pressure surface of the rotor blade in the case of the conventional rotor blade row 8, the tip clearance flow is enlarged.

In the present invention shown in FIG. 6A, the outlet cross sectional area is formed larger than the inlet cross sectional area of the rotor blade row 10, and the component in the axial direction is 200 m/s in an upstream side and is 109 m/s corresponding to an approximately half in a downstream side. Accordingly, a static pressure becomes higher in the downstream side in comparison with the upstream side in this example, and an absolute speed is increased to about 218 m/s.

Further, in the present invention, the camber of the rotor blade is not necessary for achieving the speed triangle shown in FIG. 6A, and the camber is set to 0 in such a manner that the direction of the rotor blade relative speed in the inflow portion approximately coincides with the direction of the rotor blade relative speed in the outflow portion.

Further, since the outlet cross sectional area in the stator blade row 11 in the downstream side is structured smaller than the inlet cross sectional area of the rotor blade row 10, the flow forms a flow having a small speed reduction, has no risk of peeling, and is smoothly reduced in speed so as to adjust the pressure.

Figure 7:
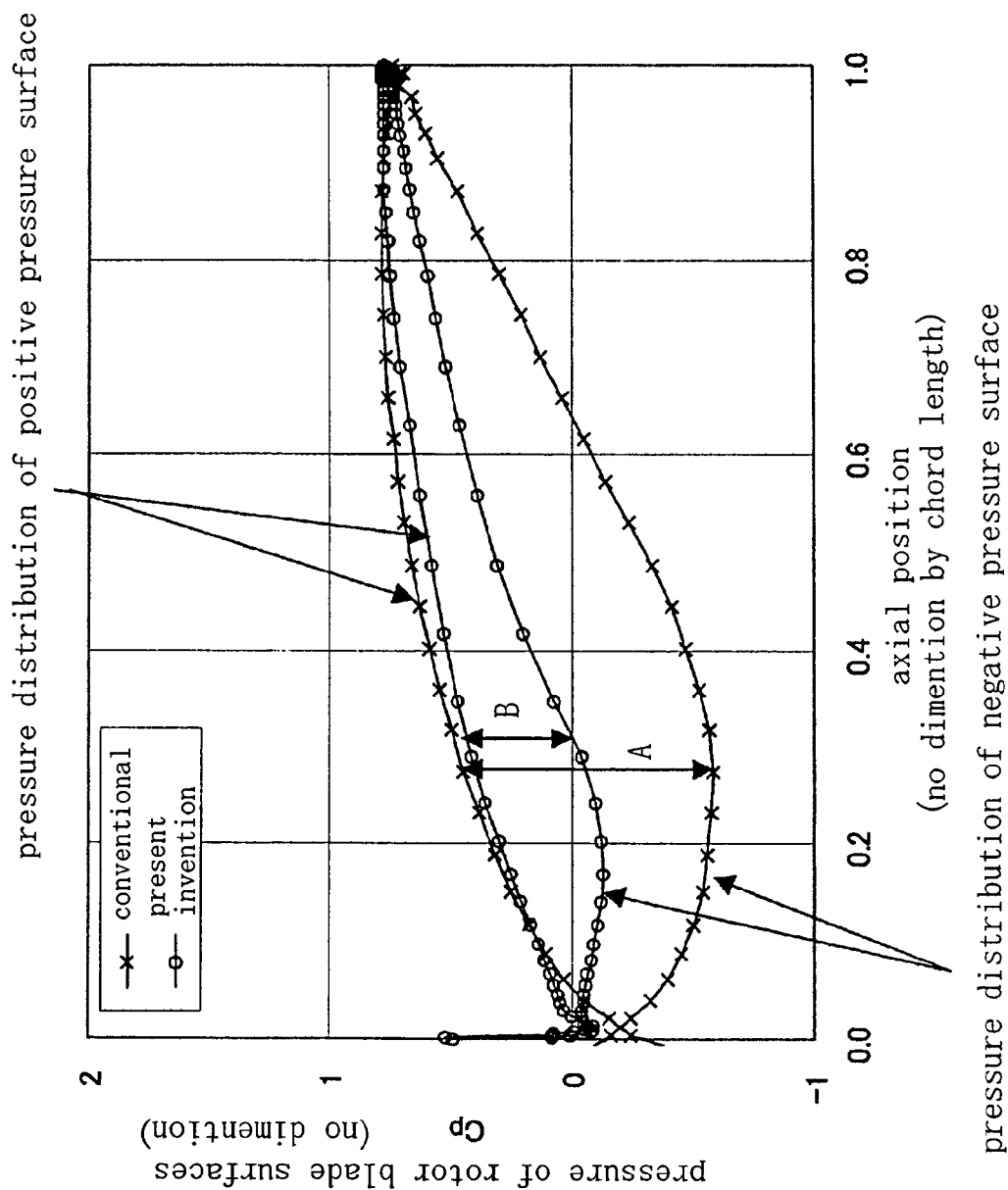
FIG. 7 is a view showing a result of analysis of a pressure distribution in a rotor blade surface.

FIG. 7 shows results of analysis of a pressure distribution of the rotor blade surface. In this drawing, marks "x" indicate a pressure distribution of the conventional rotor blade surface, and marks "O" indicate a pressure distribution of the rotor blade surface in accordance with the present invention. Further, reference symbol A in the drawing denotes a maximum pressure difference in accordance with the prior art, and reference symbol B denotes a maximum pressure difference in accordance with the present invention.

On the basis of the drawing, it is known that the pressure reduction of the negative pressure surface is enlarged, and the maximum pressure difference A is enlarged, in the conventional rotor blade surface. On the contrary, in the rotor blade surface in accordance with the present invention, it is known that the pressure reduction of the negative pressure surface is small, and the maximum pressure difference B becomes small to a value equal to or less than a half in comparison with the conventional one.

As mentioned above, in accordance with the structure of the present invention, since the outlet cross sectional area is formed larger than the inlet cross sectional area of the rotor blade row 10, the speed in the axial direction of the flow is reduced within the rotor blade row.

Accordingly, taking the speed triangle of the rotor blade into consideration, the same work of the rotor blade can be obtained even by reducing the speed in the axial direction without largely curving the flow by the blade. In the case that the same pressure ratio is obtained, an amount at which the flow is curved can be reduced by widening the passage. Accordingly, the pressure difference between the positive pressure surface and the negative pressure surface of the blade becomes small, it is possible to reduce the tip clearance flow, and it is possible to obtain the rotor blade having a wide stable working range at a high pressure ratio by reducing the tip clearance flow.

Further, in accordance with the structure in which the output cross sectional area of the stator blade row 11 is smaller than the inlet cross sectional area of the rotor blade row, the flow in the stator blade row 11 forms the flow having the small speed reduction, has a small risk of peeling, smoothly reduces the speed and can adjust the pressure.

Further, in accordance with the structure in which the camber of the rotor blade row 11 is set to be small, the pressure difference between the positive pressure surface and the negative pressure surface of the blade becomes smaller, it is possible to reduce the tip clearance flow, and it is possible to obtain the rotor blade having a wide stable working range at a higher pressure ratio than that of the conventional blade.

As mentioned above, in accordance with the axial flow compressor of the present invention, it is possible to obtain excellent effects that it is possible to reduce the tip clearance flow circulating from the positive pressure surface to the negative pressure surface of the rotor blade even in the case that the blade is made so as to use in high load, whereby it is possible to inhibit the stall generation and the surging phenomenon.

In this case, it goes without saying that the present invention is not limited to the embodiment mentioned above, and can be variously modified within the scope of the present invention.

The invention claimed is:

1. An axial flow compressor comprising:
a rotor blade row formed such that a downstream side cross sectional area of an outlet is larger than an upstream side cross sectional area of an inlet so as to reduce a speed in an axial direction and reduce a pressure difference between a positive pressure surface and a negative pressure surface of a rotor blade in the rotor blade row; and
a first stator blade row provided on a downstream side of the rotor blade row, wherein an output cross sectional area of the first stator blade row is structured to be smaller than an inlet cross sectional area of the first stator blade row so that the rotor blade row and the first stator blade row of the axial flow compressor form a cambered meridional shape.

2. An axial flow compressor as claimed in claim 1, wherein the output cross sectional area of said first stator blade row is structured to be smaller than the cross sectional area of the inlet of said rotor blade row.

3. An axial flow compressor as claimed in claim 1, wherein a turning angle of flow in the rotor blade in said rotor blade row is set to be equal to or less than 15 degrees such that a difference between a direction of a rotor blade relative speed in an inflow portion and a direction of a rotor blade relative speed in an outflow portion becomes small.

4. An axial flow compressor as claimed in claim 3, wherein the rotor blade has a camber that is set to zero.

5. An axial flow compressor as claimed in claim 1, wherein the rotor blade has a camber that is set to zero.

6. An axial flow compressor as claimed in claim 1, further comprising:

a second stator blade row provided on an upstream side of the rotor blade row, wherein an output cross sectional area of the second stator blade row is structured to be the same as an inlet cross sectional area of the second stator blade row.

7. An axial flow compressor as claimed in claim 1, further comprising:

a casing having an inner surface disposed to define a tip clearance with the rotors of the rotor blade row.

8. An axial flow compressor as claimed in claim 7, wherein the casing has a cambered meridional shape.

\* \* \* \* \*